(12) United States Patent
Seong et al.

(10) Patent No.: US 9,023,503 B2
(45) Date of Patent: May 5, 2015

(54) BATTERY MODULE WITH COOLING STRUCTURE OF HIGH EFFICIENCY

(71) Applicant: LG Chem, Ltd., Seoul (KR)

(72) Inventors: JunYeob Seong, Daejeon (KR); BumHyun Lee, Daejeon (KR); DalMo Kang, Daejeon (KR); YongSeok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/107,748

(22) Filed: Dec. 16, 2013

(65) Prior Publication Data

US 2014/0099527 A1 Apr. 10, 2014

Related U.S. Application Data

(63) Continuation of application No. PCT/KR2012/007624, filed on Sep. 24, 2012.

(30) Foreign Application Priority Data

May 8, 2012 (KR) .................. 10-2012-0048352

(51) Int. Cl.
*H01M 10/52* (2006.01)
*H01M 10/50* (2006.01)
(Continued)

(52) U.S. Cl.
CPC ...... *H01M 10/5004* (2013.01); *H01M 10/5032* (2013.01); *H01M 10/5055* (2013.01); *H01M 2/0275* (2013.01); *H01M 2/1077* (2013.01); *H01M 10/5016* (2013.01);
(Continued)

(58) Field of Classification Search
None
See application file for complete search history.

(56) References Cited

U.S. PATENT DOCUMENTS

2009/0186265 A1 7/2009 Koetting et al.
2011/0059347 A1* 3/2011 Lee et al. .................. 429/120
(Continued)

FOREIGN PATENT DOCUMENTS

JP 2012-079666 A 4/2012
KR 10-2008-0042965 A 5/2008
(Continued)

OTHER PUBLICATIONS

Kang et al., Battery having specific package structure, WO 2005/074054, English Abstract.*
(Continued)

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

Disclosed herein is a battery module including chargeable and dischargeable battery cells which are sequentially arranged in a stacked state, cartridges fixing edges of the respective battery cells to form a battery cell stacked structure, and heat transfer members mounted between the respective battery cells, edges of the heat transfer members being partially or entirely fixed to the respective cartridges. The battery module according to the present invention is configured to have a structure in which the heat transfer members, to which heat generated from the battery cells is conducted, are coupled to the cartridges to fix the battery cells and, at the same time, to cool the battery cells, thereby improving cooling efficiency, reducing the size of the battery module to have a compact structure, and improving structural stability of the battery cells.

15 Claims, 4 Drawing Sheets

(51) Int. Cl.
*H01M 10/613* (2014.01)
*H01M 10/647* (2014.01)
*H01M 10/6555* (2014.01)
*H01M 2/10* (2006.01)
*H01M 10/625* (2014.01)
*H01M 2/02* (2006.01)
*H01M 10/6556* (2014.01)
*H01M 10/6561* (2014.01)
*H01M 10/6567* (2014.01)

(52) U.S. Cl.
CPC ...... *H01M 10/5057* (2013.01); *H01M 10/5063* (2013.01); *H01M 10/5075* (2013.01); *H01M 2220/20* (2013.01)

(56) References Cited

U.S. PATENT DOCUMENTS

| | | | | |
|---|---|---|---|---|
| 2011/0244299 | A1* | 10/2011 | Guener et al. | 429/120 |
| 2011/0293982 | A1* | 12/2011 | Martz et al. | 429/120 |
| 2012/0040223 | A1* | 2/2012 | Odumodu | 429/120 |
| 2012/0064383 | A1 | 3/2012 | Tonomura et al. | |
| 2012/0214033 | A1 | 8/2012 | Dämon et al. | |

FOREIGN PATENT DOCUMENTS

| | | |
|---|---|---|
| KR | 10-2009-0079802 A | 7/2009 |
| KR | 10-2010-0109872 A | 10/2010 |
| WO | WO 2005/074054 A1 | 8/2005 |
| WO | WO 2011/051386 A1 | 5/2011 |

OTHER PUBLICATIONS

Thanner et al, Battery Cell System, WO 2011/051386, English Abstract.*
Kang et al., Battery having specific package structure, WO 2005/074054, Aug. 11, 2005, English Abstract.*
Thanner et al, Battery Cell System, WO 2011/051386, May 5, 2011, English Abstract.*
International Search Report issued in PCT/KR2012/007624, mailed on Feb. 1, 2013.

* cited by examiner

BATTERY MODULE WITH COOLING STRUCTURE OF HIGH EFFICIENCY

CROSS REFERENCE TO RELATED APPLICATIONS

This application is a Bypass Continuation of PCT International Application No. PCT/KR2012/007624 filed on Sep. 24, 2012, which claims priority under 35 U.S.C §119(a) to Patent Application No. 10-2012-0048352 filed in the Republic of Korea on May 8, 2012, all of which are hereby expressly incorporated by reference into the present application.

TECHNICAL FIELD

The present invention relates to a battery module including chargeable and dischargeable battery cells which are sequentially arranged in a stacked state, cartridges fixing edges of the respective battery cells to form a battery cell stacked structure, and heat transfer members mounted between the respective battery cells, edges of the heat transfer members being partially or entirely fixed to the respective cartridges.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting such a middle or large-sized battery module may be secondary batteries which can be charged and discharged. Consequently, a large amount of heat is generated from such high-output, large-capacity secondary batteries during charge and discharge of the batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a high-output, large-capacity battery pack needs a cooling system to cool battery cells mounted therein.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge, and a plurality of cartridges may be stacked to constitute a battery module. Coolant channels are defined between the stacked battery cells or between the stacked battery modules so that heat accumulated between the stacked battery cells or between the stacked battery modules is effectively removed.

In this structure, however, it is necessary to provide a plurality of coolant channels corresponding to a plurality of battery cells with the result that the overall size of the battery module is increased.

In addition, intervals between the coolant channels are relatively narrowed as a plurality of battery cells is stacked in consideration of the size of the battery module. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. Furthermore, a fan may be further provided to prevent such pressure loss. In this case, however, design may be restricted due to power consumption, fan noise, space, or the like.

Consequently, there is a high necessity for a battery module which can be manufactured to have a simple and compact structure while providing high-output, large-capacity power and exhibits excellent lifespan characteristics and stability based on high cooling efficiency.

DISCLOSURE

Technical Problem

Therefore, the present invention has been made to solve the above problems and other technical problems that have yet to be resolved.

It is an object of the present invention to provide a battery module, manufacturing efficiency of which is improved by minimizing addition of components to cool the battery module and which is configured to have a compact structure with structural stability. In addition, it is another object of the present invention to provide a battery module including heat transfer members configured to have a structure to effectively remove heat from battery cells.

Technical Solution

In accordance with one aspect of the present invention, the above and other objects can be accomplished by the provision of a battery module including chargeable and dischargeable battery cells which are sequentially arranged in a stacked state, cartridges fixing edges of the respective battery cells to form a battery cell stacked structure, and heat transfer members mounted between the respective battery cells, edges of the heat transfer members being partially or entirely fixed to the respective cartridges.

Generally, in a case in which a cooling structure is included in a battery module, a plurality of components is added and a manufacturing process is complicated. As a result, the volume and production cost of the battery module are greatly increased.

In the present invention, therefore, the battery module is constructed by coupling the heat transfer members, to which heat generated from battery cells is conducted, to the cartridges without additional cooling-related components, unlike cartridges disposed between battery cells while fixing edges of the battery cells, thereby improving cooling efficiency and reducing the size of the battery module to have a compact structure.

In addition, the heat transfer members are located between the respective battery cells, thereby improving structural stability of the battery cells.

Preferably, each of the battery cells is a plate-shaped battery cell, which provides a high stack rate in a limited space. The plate-shaped battery cells may be stacked such that one major surface of each plate-shaped battery cell faces a corresponding major surface of a neighboring plate-shaped battery cell or such that opposite major surfaces of each plate-shaped battery cell face corresponding major surfaces of neighboring plate-shaped battery cells.

For example, each of the battery cells may be a pouch-shaped battery cell configured to have a structure in which an electrode assembly is mounted in a battery case formed of a laminate sheet including a resin layer and a metal layer Specifically, each of the battery cells is a pouch-shaped secondary battery in which an electrode assembly of a cathode/separator/anode structure is disposed in a battery case together with an electrolyte in a sealed state. For example, each of the battery cells may be a plate-shaped battery cell configured to have an approximately hexahedral structure having a small thickness to width ratio. Generally, the pouch-shaped battery cell includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a thermally weldable polymer resin are sequentially stacked.

The battery case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions of the edge of the battery case are sealed by thermal welding. The pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The pouch-shaped battery cells are stacked while being fixed by the cartridges. Specifically, the thermally welded edges of the pouch-shaped battery cells are disposed between the respective cartridges such that the pouch-shaped battery cells fixed by the cartridges.

The structure of each of the heat transfer members is not particularly restricted so long as each of the heat transfer members is a thin member exhibiting high thermal conductivity. For example, each of the heat transfer members may be formed of a metal sheet. Specifically, the metal sheet may be an aluminum sheet or an aluminum alloy sheet which exhibits high thermal conductivity and is lightweight. However, embodiments of the present invention are not limited thereto.

In a battery module using conventional cartridges, direct contact between battery cells is prevented by the thickness of each of the cartridges disposed between the respective battery cells. In this structure, however, the height of a battery cell stack is increased with the result that volume of the battery module is increased. Generally, a cartridge is manufactured by injection molding of an insulative resin. The cartridges disposed between the battery cells may be reduced in order to reduce the height of the battery cell stack. However, such reduction is limited in terms of injection materials and injection methods.

As in the present invention, on the other hand, a metal sheet, such as an aluminum sheet or an aluminum alloy sheet, may be manufactured to have a very thin structure. Consequently, the metal sheet may be manufactured to have a thinner structure than the structure formed by injection of an insulative resin.

In a case in which each of the heat transfer members is formed of a metal sheet, therefore, the height of the battery cell stack may be reduced with the result that the volume of the battery module may be reduced. In addition, a cooling effect, which is not provided by the conventional cartridge structure, may be achieved.

In a preferred example, coupling between the cartridges and the heat transfer members may be achieved using various methods, such as fastening and bonding. Preferably, each of the heat transfer members is integrated with a corresponding one of the cartridges by insert injection molding.

In addition, each of the cartridges may be formed of an electrically insulative material. The material for each of the cartridges is not particularly restricted so long as each of the cartridges is formed of an electrically insulative material that can be integrated with a corresponding one of the heat transfer members by insert injection molding. Preferably, each of the cartridges is formed of a plastic resin.

Consequently, the cartridges having the above-stated structure may isolate the plate-shaped battery cells mounted in the cartridges from outside and, at the same time, may dissipate heat generated from the plate-shaped battery cells outside. Consequently, production cost may be reduced and the production process may be further simplified as compared with the conventional cartridges manufactured separately from the heat transfer members.

Meanwhile, as previously described, the edges of the plate-shaped battery cells may be fixed by the cartridges to form a battery cell stacked structure and the tops and/or the bottoms of the plate-shaped battery cells may contact the heat transfer members. In particular, in a case in which the plate-shaped battery cells are pouch-shaped battery cells, a sealed portion is formed at the edge of each of the battery cells and, in a case in which cooling fins made of a metal material are used to cool the battery cells, the sealed portions formed at the edges of the battery cells are insulated to prevent a short circuit between the battery cells.

In the structure in which the heat transfer members contact the tops and the bottoms of the plate-shaped battery cells and the sealed portions formed at the edges of the battery cells are pressed by the cartridges, which are made of an insulative material, such that the pouch-shaped battery cells are fixed to the cartridges as described above, however, it is not necessary to insulate the sealed portions formed at the edges of the battery cells, thereby reducing manufacturing cost of the battery module and simplifying the manufacturing process of the battery module.

In a preferred example, each of the heat transfer members may be configured to have a structure in which ends of each of the heat transfer members extend through a corresponding one of the cartridges such that the ends of each of the heat transfer members are exposed to an outside of the corresponding cartridge. That is, insert injection molding is carried out to have a structure in which the ends of each of the heat transfer members extend through a corresponding one of the cartridges such that the ends of each of the heat transfer members are exposed to an outside of the corresponding cartridge. As a result, the heat transfer members are coupled to the cartridges. In this case, the ends of each of the heat transfer members exposed to the outside of the corresponding cartridge may be bent such that the exposed ends of each of the heat transfer members tightly contact the outside of the corresponding cartridge.

Meanwhile, the battery module may further include cooling members mounted to outsides of the cartridges such that heat generated from the battery cells are conducted to the cooling members to cool the battery cells. The cooling members may contact the ends of the heat transfer members exposed to the outsides of the cartridges such that heat is conducted to the cooling members. That is, heat generated from the battery cells may be conducted to the heat transfer members and may be transferred to the cooling members via the ends of the heat transfer members such that the cooling members remove the heat.

The structure in which the cooling members are mounted at the outsides of the cartridges is not particularly restricted. For example, each of the cartridges may be provided at opposite sides of a frame thereof with protrusions having fastening grooves and each of the cooling members may have fastening members, which are coupled into the respective fastening grooves, such that the cooling members are coupled to the opposite sides of the frames of the cartridges through coupling of the fastening members into the fastening grooves. Alternatively, the fastening grooves may be formed at the cooling members and the fastening members may be formed at the cartridge frames. In such a coupling structure, the cooling members may be mounted at the outsides of the cartridges using various coupling methods, such as fastening, bonding, and welding.

The structure of the cooling members is not particularly restricted so long as the cooling members remove heat conducted from the ends of the heat transfer members. For example, each of the cooling members may be a water cooling type cooling member configured to have a structure in which a coolant flow channel is formed in each of the cooling members and a coolant flows in the coolant flow channel.

That is, in a structure in which the cooling members are not mounted, on the other hand, an air cooling structure in which a coolant, such as air, is supplied to the ends of the heat transfer members to cool the ends of the heat transfer members may be used. On the other hand, in a structure in which the cooling members are mounted, cooling may be carried out in a water cooling fashion as described above. Consequently, switching between the air cooling structure and the water cooling structure is easily performed and the air cooling structure or the water cooling structure may be adopted based on the structure of the battery module and external environment.

The battery cells are not particularly restricted so long as the battery cells are secondary batteries that are capable of supplying high voltage and high current during configuration of a battery module and a battery pack. Preferably, each of the battery cells is a lithium ion battery or a lithium ion polymer battery having high energy storage per volume.

In accordance with another aspect of the present invention, there is provided a battery pack including the battery module with the above-stated construction as a unit module.

The battery pack may be manufactured by combining battery modules as unit modules based on desired output and capacity. The battery pack may be used as a power source for an electric vehicle, a hybrid electric vehicle, a plug-in hybrid electric vehicle, or a power storage device in consideration of installation efficiency and structural stability. However, an applicable range of the battery pack is not limited thereto.

In accordance with a further aspect of the present invention, there is provided a device including a battery pack with the above-stated construction as a power source. Specifically, the device may be an electric vehicle, a hybrid electric vehicle, a plug-in hybrid electric vehicle, or a power storage device.

The structure and manufacturing method of such a device are well known in the art to which the present invention pertains and, therefore, a detailed description thereof will be omitted.

Effects of the Invention

As is apparent from the above description, a battery module according to the present invention is configured to have a structure in which heat transfer members, to which heat generated from battery cells is conducted, are coupled to cartridges to fix the battery cells and, at the same time, to cool the battery cells, unlike cartridges configured to have a structure only to fix edges of battery cells, thereby improving cooling efficiency, reducing the size of the battery module to have a compact structure, and improving structural stability of the battery cells.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
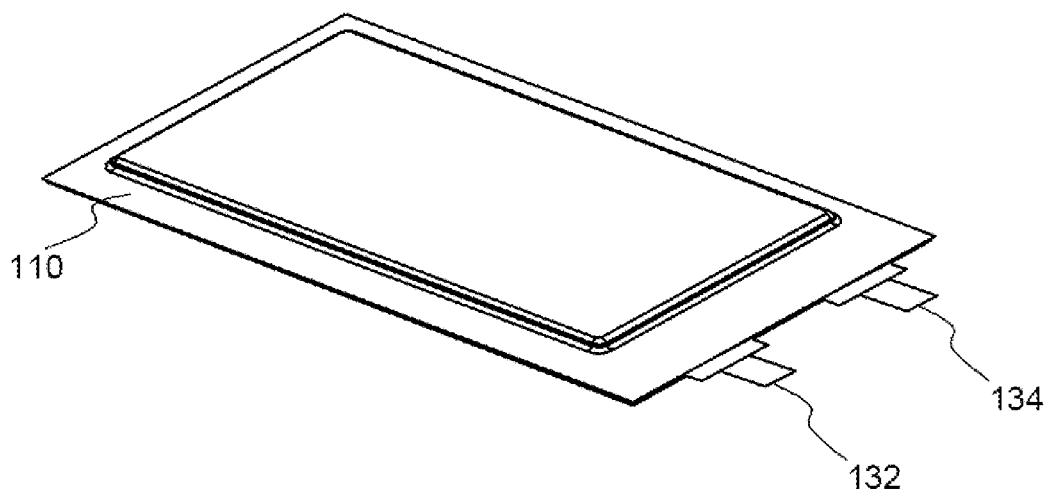
FIG. 1 is a perspective view showing a battery cell used in a battery module.
Figure 2:
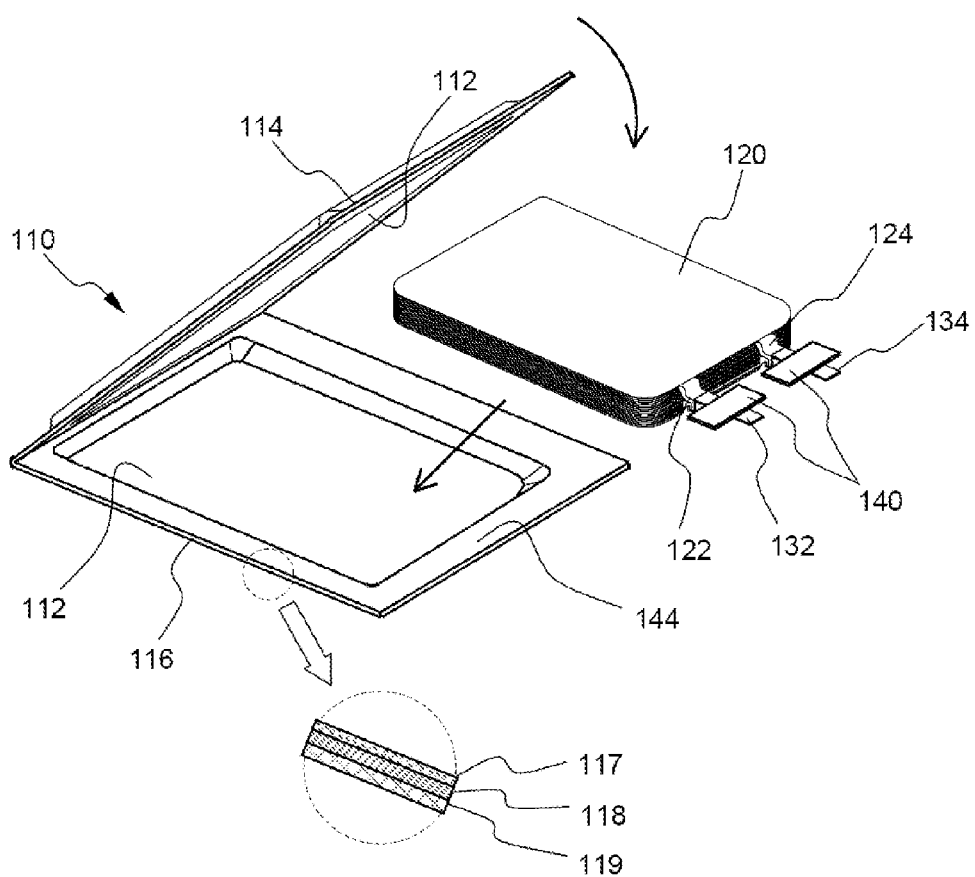
FIG. 2 is an exploded perspective view of FIG. 1.

FIG. 1 is a perspective view typically showing an exemplary battery cell used in a battery module according to the present invention and FIG. 2 is an exploded perspective view of FIG. 1.

Referring to these drawings, a pouch-shaped battery cell 100 is configured to have a structure in which an electrode assembly 120, including cathodes, anodes, and separators disposed respectively between the cathodes and the anodes, is mounted in a pouch-shaped battery case 110 in a sealed state such that two electrode terminals 132 and 134 electrically connected to cathode tabs 122 and anode tabs 124 of the electrode assembly 120 are exposed to the outside.

The battery case 110 includes an upper case 114 and a lower case 116 jointly having a depressed receiving part 112, in which the electrode assembly 120 is located.

The cathode tabs 122 and the anode tabs 124 of the electrode assembly 120, which may be configured to have a folded type structure, a stacked type structure, or a stacked/folded type structure, are respectively coupled to the electrode terminals 132 and 134 by welding. In addition, insulative films 140 are attached to the top and bottom of each of the electrode terminals 132 and 134 to prevent the occurrence of a short circuit between a thermal welding device and the electrode terminals 132 and 134 and to achieve sealing between the electrode terminals 132 and 134 and the battery case 110 when edges of the upper case 114 and the lower case 116 are thermally welded to each other using the thermal welding device.

The upper case 114 and the lower case 116 each include an outer resin layer 117, an isolation metal layer 118, and an inner resin layer 119. The inner resin layers 119 of the upper case 114 and the lower case 116 may be welded to each other by heat and pressure generated from the thermal welding device (not shown).

The edges of the upper case 114 and the lower case 116 are thermally welded to each other in a state in which the electrode assembly 120, which is impregnated with an electrolyte, is mounted in the receiving part 112 to form a sealed portion.

Figure 3:
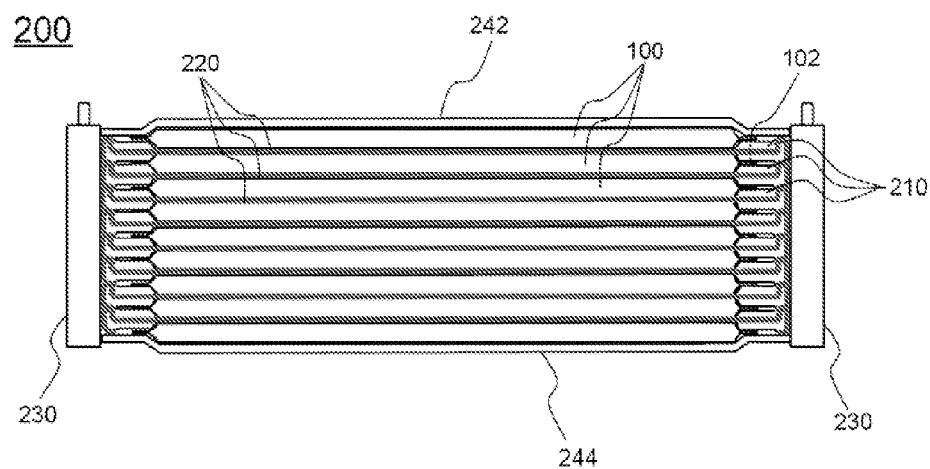
FIG. 3 is a vertical sectional view showing a battery module according to an embodiment of the present invention.
Figure 4:
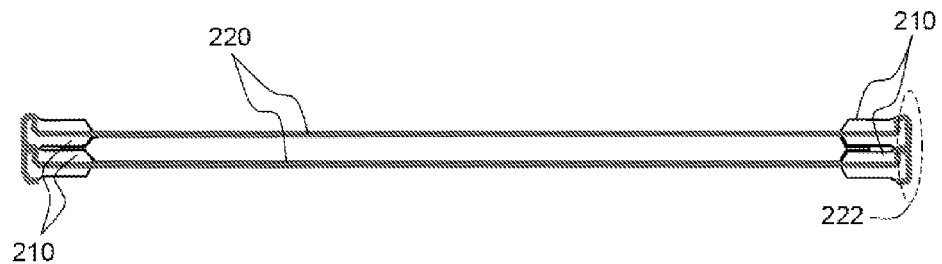
FIG. 4 is a partially enlarged view of FIG. 3 showing a structure in which a battery cell is mounted between cartridges.

FIG. 3 is a vertical sectional view typically showing a battery module according to an embodiment of the present invention and FIG. 4 is a partially enlarged view of FIG. 3 typically showing a structure in which a battery cell is mounted between cartridges.

Referring first to FIG. 3, a battery module 200 is configured to have a structure in which battery cells 100, cartridges 210 to fix the battery cells 100, and heat transfer members 220 mounted between the respective battery cells 100 are arranged between an upper plate 242 and a lower plate 244 to form a stacked structure and cooling members 230 are mounted to outsides of the cartridges 210.

Each battery cell 100 is configured to have a plate-shaped structure. The battery cells 100 are sequentially stacked such that such that one major surface of each battery cell 100 faces a corresponding major surface of a neighboring battery cell 100 or such that opposite major surfaces of each battery cell 100 face corresponding major surfaces of neighboring battery cells 100. The cartridges 210 fix edges of the respective battery cells 100 to form a battery cell stacked structure. Specifically, a sealed edge portion 102 of each plate-shaped battery cell is fixed between neighboring cartridges 210. This structure is applied to all of the battery cells to form such a battery cell stacked structure.

Each heat transfer member 220 is formed of a metal sheet exhibiting high thermal conductivity. Opposite ends of each heat transfer member 220 extend through a corresponding cartridge 210 such that the opposite ends of each heat transfer member 220 are exposed to the outside of the corresponding cartridge 210. The exposed ends of each heat transfer member 220 contact the cooling members 230. Consequently, heat generated from the battery cells 100 are transferred to the cooling members 230 via the heat transfer members 220 such that the cooling members 230 absorb the heat to adjust temperature of the battery module 200.

Each cooling member 230 has a coolant flow channel (not shown) formed therein such that heat generated from the battery cells removed through an air cooling structure or a water cooling structure.

Although the battery module 200 is configured to have a structure in which the cooling members 230 are mounted as shown in FIG. 3, the cooling members 230 may not be mounted. In the structure in which the cooling members 230 are not mounted, a coolant, such as air, may be supplied to the exposed ends of the heat transfer members 220 such that the exposed ends of the heat transfer members 220 are cooled through an air cooling structure.

In the structure in which the cooling members 230 are mounted, therefore, cooling is carried out through a water cooling structure. In the structure in which the cooling members 230 are not mounted, on the other hand, cooling is carried out through an air cooling structure. That is, any one selected from between the air cooling structure and the water cooling structure may be adopted based on the structure of the battery module and external environment. Switching between the air cooling structure and the water cooling structure is easily performed.

Referring to FIG. 4 together with FIG. 3, the opposite ends of each heat transfer member 220 extend through a corresponding cartridge 210 such that the ends of each heat transfer member 220 are exposed to the outside of the corresponding cartridge 210. The exposed ends of each heat transfer member 220 are bent such that the exposed ends of each heat transfer member 220 tightly contact the outside of the corresponding cartridge 210. The top and bottom of each plate-shaped battery cell 100 contact corresponding heat transfer members 220 such that heat generated from the battery cells 100 are effectively conducted to the heat transfer members 220.

Each cartridge 210 is formed of an insulative material. In a cartridge 210—battery cell 100 fixing structure, the edges of the battery cells 100 do not contact the heat transfer members 220, each of which is formed of a metal material, but contact the insulative cartridges 210. Consequently, an additional process for insulating the edge of each battery cell 100 is not needed.

In addition, each cartridge 210 and a corresponding heat transfer member 220 are integrated by insert injection molding. Consequently, a process for manufacturing the heat transfer member and the cartridge and a process for assembling the heat transfer member and the cartridge are not needed, thereby reducing production cost and improving production efficiency.

Figure 5:
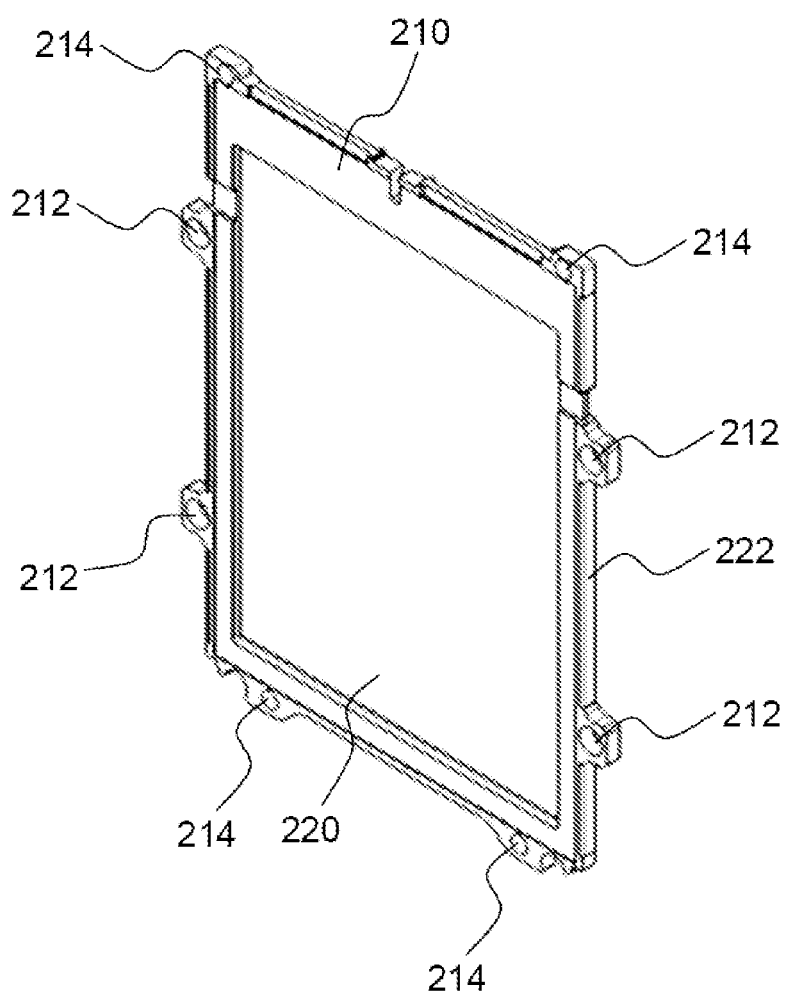
FIG. 5 is a perspective view showing a structure in which a heat conductive member is coupled to a cartridge.

FIG. 5 is a perspective view typically showing a structure in which a heat conductive member is coupled to a cartridge by insert injection molding.

Referring to FIG. 5 together with FIGS. 3 and 4, a cartridge 210 is provided at opposite sides of a frame thereof with protrusions having fastening grooves 212 and cooling members 230 have fastening members (not shown), which are coupled into the respective fastening grooves 212 of the cartridge 210. Consequently, the cooling members 230 are mounted to the opposite sides of the cartridge 210 through coupling between the fastening grooves and the fastening members.

In the above structure, bent ends 222 of a heat transfer member 220 tightly contacting the outside of the cartridge 210 contact the corresponding cooling members 230 in a surface contact fashion such that heat generated from battery cells 100 is transferred to the cooling members 230.

Meanwhile, through holes 214 used to fix cartridges 210 are formed at corner portions of the frame of the cartridge 210. Consequently, the cartridges 210 may be fixed together with the battery cells 100 between the upper case 242 and the lower case 244 of the battery module 200 using fastening members (not shown) extending through the through holes 214 of the cartridges 210.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
chargeable and dischargeable battery cells which are sequentially arranged in a stacked state;
cartridges fixing edges of the respective battery cells to form a battery cell stacked structure;
cooling members mounted to the outsides of the cartridges; and
heat transfer members mounted between the respective battery cells, edges of the heat transfer members being partially or entirely fixed to the respective cartridges,
wherein ends of each of the heat transfer members extend through a corresponding one of the cartridges such that the ends of each of the heat transfer members are exposed to an outside of the corresponding cartridge,
wherein the ends of each of the heat transfer members exposed to the outside of the corresponding cartridge are bent such that the exposed ends of each of the heat transfer members tightly contact the outside of the corresponding cartridge,
wherein each of the battery cells is a lithium secondary battery, and
wherein the ends of the heat transfer members contact the cooling members.

2. The battery module according to claim 1, wherein the battery cells are plate-shaped battery cells which are stacked such that one major surface of each plate-shaped battery cell faces a corresponding major surface of a neighboring plate-shaped battery cell or such that opposite major surfaces of each plate-shaped battery cell face corresponding major surfaces of neighboring plate-shaped battery cells.

3. The battery module according to claim 2, wherein the plate-shaped battery cells are pouch-shaped battery cells, each of which is manufactured by placing an electrode assembly in a case formed of a laminate sheet comprising a resin layer and a metal layer and sealing an edge of the case.

4. The battery module according to claim 3, wherein thermally welded edges of the pouch-shaped battery cells are fixed between the respective cartridges.

5. The battery module according to claim 1, wherein each of the heat transfer members is formed of a metal sheet.

6. The battery module according to claim 5, wherein the metal sheet is an aluminum sheet or an aluminum alloy sheet.

7. The battery module according to claim 1, wherein each of the heat transfer members is coupled to a corresponding one of the cartridges by insert injection molding of the corresponding cartridge.

8. The battery module according to claim 1, wherein each of the heat transfer members is formed of a metal material and is integrated with a corresponding one of the cartridges by insert injection molding.

9. The battery module according to claim 1, wherein each of the cartridges is formed of an electrically insulative material.

10. The battery module according to claim 1, wherein each of the cartridges is provided at opposite sides of a frame thereof with protrusions having fastening grooves and each of the cooling members has fastening members, which are coupled into the respective fastening grooves, such that the cooling members are coupled to the opposite sides of the frames of the cartridges through coupling of the fastening members into the fastening grooves.

11. The battery module according to claim 1, wherein each of the cooling members is an air cooling type and/or water cooling type cooling member.

12. A battery pack comprising a battery module according to claim 1 as a unit module.

13. A device comprising a battery pack according to claim 12.

14. The device according to claim 13, wherein the device is an electric vehicle, a hybrid electric vehicle, a plug-in hybrid electric vehicle, or a power storage device.

15. A battery module comprising:
chargeable and dischargeable battery cells which are sequentially arranged in a stacked state;
cartridges fixing edges of the respective battery cells to form a battery cell stacked structure;
cooling members mounted to the outsides of the cartridges; and
heat transfer members mounted between the respective battery cells, edges of the heat transfer members being partially or entirely fixed to the respective cartridges,
wherein ends of each of the heat transfer members extend through a corresponding one of the cartridges such that the ends of each of the heat transfer members are exposed to an outside of the corresponding cartridge, and
wherein the ends of each of the heat transfer members exposed to the outside of the corresponding cartridge are bent such that the exposed ends of each of the heat transfer members tightly contact the outside of the corresponding cartridge,
wherein the ends of the heat transfer members contact the cooling members.

* * * * *